(12) United States Patent
Sahoo

(10) Patent No.: US 7,917,856 B2
(45) Date of Patent: Mar. 29, 2011

(54) CONVERTING BETWEEN USER INTERFACE TECHNOLOGIES

(75) Inventor: Manas Sahoo, Bangalore (IN)

(73) Assignee: SAP AG, Walldorf (DE)

( * ) Notice: Subject to any disclaimer, the term of this patent is extended or adjusted under 35 U.S.C. 154(b) by 345 days.

(21) Appl. No.: 11/405,733

(22) Filed: Apr. 18, 2006

(65) Prior Publication Data

US 2007/0094604 A1    Apr. 26, 2007

(30) Foreign Application Priority Data

Oct. 24, 2005  (IN) .......................... 2825/DEL/2005

(51) Int. Cl.
*G06F 3/00* (2006.01)
*G06F 17/00* (2006.01)
*G06F 9/44* (2006.01)

(52) U.S. Cl. ........ 715/746; 715/234; 715/239; 715/744; 715/760; 715/866; 717/100; 717/106; 717/114; 717/120

(58) Field of Classification Search .................. 715/746
See application file for complete search history.

(56) References Cited

U.S. PATENT DOCUMENTS

| | | | | | |
|---|---|---|---|---|---|
| 4,667,290 | A | * | 5/1987 | Goss et al. | 717/147 |
| 5,586,330 | A | * | 12/1996 | Knudsen et al. | 717/136 |
| 5,831,609 | A | * | 11/1998 | London et al. | 715/746 |
| 5,946,489 | A | * | 8/1999 | Yellin et al. | 717/147 |
| 6,066,181 | A | * | 5/2000 | DeMaster | 717/148 |
| 6,351,842 | B2 | * | 2/2002 | Ahmavuo et al. | 717/107 |
| 6,748,570 | B1 | * | 6/2004 | Bahrs et al. | 715/210 |
| 6,772,413 | B2 | * | 8/2004 | Kuznetsov | 717/136 |
| 6,865,733 | B2 | * | 3/2005 | Broussard | 717/147 |
| 2002/0147763 | A1 | * | 10/2002 | Lee et al. | 709/202 |
| 2003/0056204 | A1 | * | 3/2003 | Broussard | 717/140 |
| 2005/0055670 | A1 | * | 3/2005 | Otto et al. | 717/121 |
| 2005/0149914 | A1 | * | 7/2005 | Krapf et al. | 717/136 |
| 2005/0188353 | A1 | * | 8/2005 | Hasson et al. | 717/116 |
| 2006/0101442 | A1 | * | 5/2006 | Baumgart et al. | 717/162 |
| 2006/0123345 | A1 | * | 6/2006 | Parimi | 715/746 |
| 2007/0073763 | A1 | * | 3/2007 | Betts et al. | 707/102 |

OTHER PUBLICATIONS

Andreas Fahle, SAP Web Dynpro: Overview, Jan. 6, 2005.*
ComputerUser Dictionary "Link" definition; accessed Dec. 12, 2008.*
Trygve Reenskaug, The Model-View-Controller (MVC) Its Past and Present, 2003, 16 pages.*
People-Centric Development in an SAP Environment: Web Dynpro and Enterprise Portals, 2004, 3 pages.*
Jeff Gebo, Introduction to Web Dynpro Business Graphics in SAP Web AS 6.40, 2003, 48 pages.*
Converting Java to C#, Jul. 15, 2003, 2 pages.*
Peter Achten, Marko van Eekelen, and Rinus Plasmeijer, Compositional Model-Views with Generic Graphical User Interfaces, 2004, 17 pages.*
Hironori Washizaki and Yoshiaki Fukazawa, A Model-View Separation Architecture for GUI Application Components, 2005, 6 pages.*
Matthew Strawbridge, XML as a Model-View-Controller System for Documents, Aug. 2004, 6 pages.*
Peter Tillert, Web Dynpro Makes Software Reuse a Reality, Oct. 24, 2003, 3 pages.*

* cited by examiner

*Primary Examiner* — Tadeese Hailu
*Assistant Examiner* — Yongjia Pan
(74) *Attorney, Agent, or Firm* — Schwegman, Lundberg & Woessner, P.A.

(57) ABSTRACT

Converting components for a first user interface (UI) technology into components for a second UI technology includes enabling the second UI technology to access first components of the first UI technology, modeling second components of the first UI technology as native components of the second UI technology, the first components being usable by the native components, and defining one or more navigational paths through the native components.

20 Claims, 2 Drawing Sheets

CONVERTING BETWEEN USER INTERFACE TECHNOLOGIES

TECHNICAL FIELD

This patent application relates generally to data processing using a digital computer and, more particularly, to converting components for a first user interface (UI) technology into components for a second UI technology.

BACKGROUND

The model-view-controller (MVC) architecture is a well-known UI technology. In the MVC architecture, user input, modeling of the external world, and visual feedback to the user are separated and handled by view, model, and controller objects (which are referred to herein simply as views, models and controllers). The controller interprets mouse and keyboard inputs from the user, and maps these user actions to commands that are sent to the model and/or view to effect appropriate changes. The model manages one or more data elements, responds to queries about its state, and responds to instructions to change state. The view manages an area of the display and is responsible for presenting data to the user through a combination of elements, such as graphics, text and controls.

One particularly useful UI technology implementing the MVC architecture is Web Dynpro for global advanced business application programming (ABAP) (hereinafter referred to simply as "Web Dynpro"), which is a proprietary UI technology from SAP® AG of Walldorf, Germany. Businesses that use Web Dynpro for some applications may also, at the same time, use other UI technologies, such as Business Server Pages (BSP), for their other applications. As a result, some applications run by those businesses may have a drastically different look-and-feel from other applications run by those businesses. This can be inconvenient for users. Also, different UI technologies may require different support. Accordingly, some businesses have taken to converting all of their applications to a single UI technology.

SUMMARY

The invention provides methods and apparatus, including computer program products, for converting components for a first UI technology (e.g., BSP) into components for a second UI technology (e.g., Web Dynpro).

In this regard, in one aspect, the invention is directed converting components for a first UI technology into components for a second UI technology. Conversion includes enabling the second UI technology to access first components of the first UI technology, modeling second components of the first UI technology as native components of the second UI technology, the first components being usable by the native components, and defining one or more navigational paths through the native components. This aspect of the invention may also include one or more of the following features.

The first UI technology may include Business Server Pages and the second UI technology may include Web Dynpro for ABAP. The first components may include attributes that are data bound to view components of the first UI technology. Enabling the UI technology to access the first components may include modeling the attributes that are data bound to the view components as context nodes and attributes of the second UI technology, and exposing the context nodes and attributes to the second UI technology. The enabling process may also include identifying public methods of the first UI technology, the public methods being part of the first components of the first UI technology, and adapting the public methods to components of the second UI technology.

The process for modeling second components of the first UI technology as native components of the second UI technology may include identifying functionality in the second components, correlating the functionality to native components of the second UI technology, and generating the native components. The native components may be generated from the second components. Generating the native components may include binding a first component to a context of a view component of the second UI technology, where the view component of the second UI technology includes a native component.

The second components may include a view and a controller, and the native components may include a view, a view controller, and a component controller. The process for defining the one or more navigational paths may include using inbound and outbound plugs associated with the native components to link at least some of the native components and thereby define the one or more navigational paths. The process for defining the navigational paths may also include exposing an event in one native component to an external interface that is accessible to a second native component.

The details of one or more examples are set forth in the accompanying drawings and the description below. Further features, aspects, and advantages of the invention will become apparent from the description, the drawings, and the claims.

DESCRIPTION OF THE DRAWINGS

Like reference numerals in different figures indicate like elements.

DETAILED DESCRIPTION

As described herein, in an MVC-based UI technology, a view corresponds to software for representing the UI of an application, a model corresponds to software that interfaces to a back-end system containing, e.g., data storage, and a controller corresponds to software that controls interactions and data transfer between a view and a model.

Figure 1:
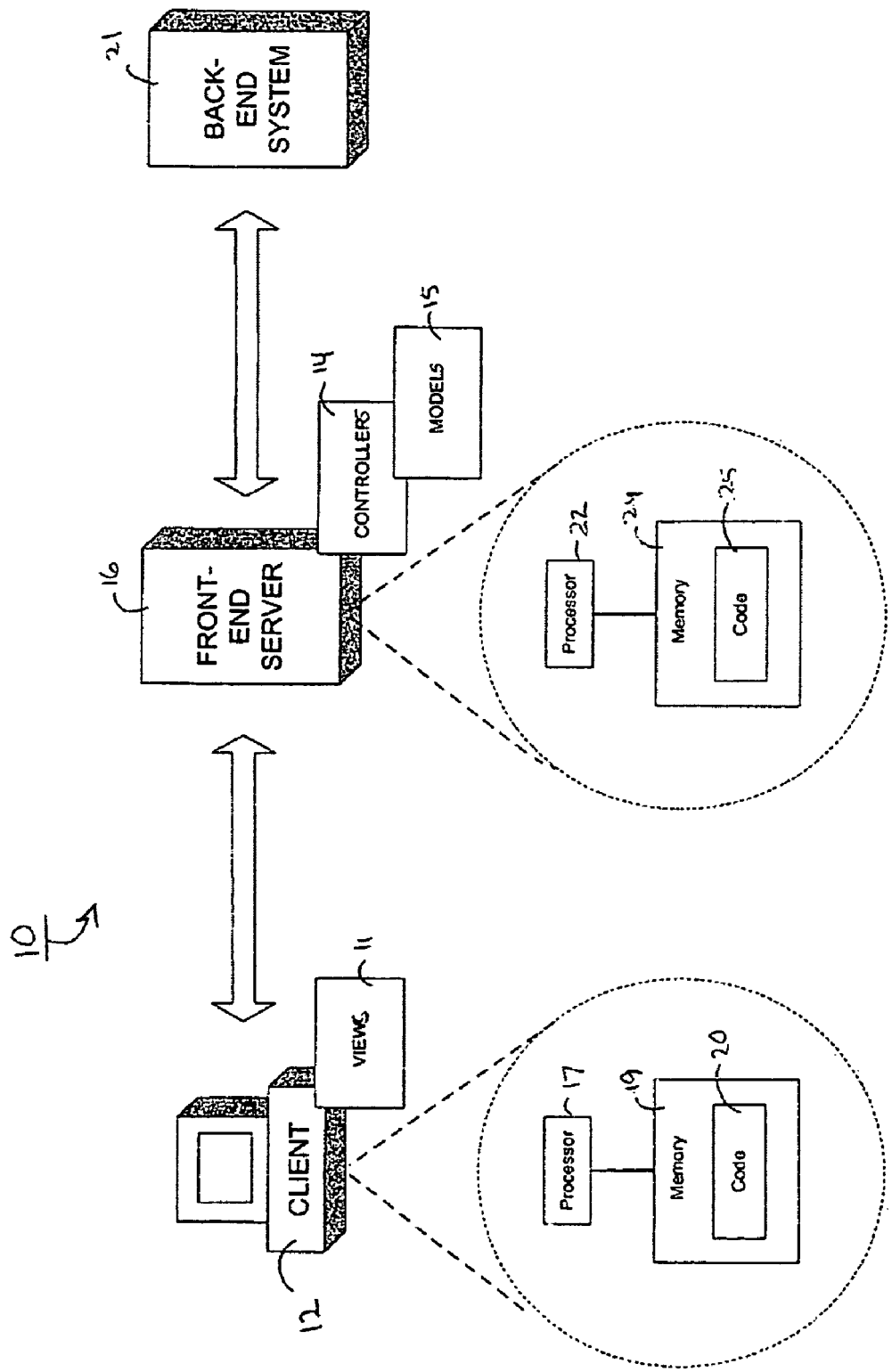
FIG. 1 is a block diagram of a network on which an MVC application is run.

FIG. 1 shows an exemplary system 10 in which views 11 are rendered on client 12, while views 11, controllers 14 and models 15 are executed on front-end server 16. In this example, client 12 may be any type of computing device, such as a desktop computer, a mainframe, or the like, that is capable of receiving and presenting data for display, and of communicating with front-end server 16. Client 12 includes one or more processor(s) 17 and memory 19 that stores code 20 for rendering views 11 and associated elements (e.g., view controllers—described below). Front-end server 16 also may be any type of computing device that is capable of processing data, and of communicating with both client 12 and back-end system 21. As shown in FIG. 1, front-end server 16 may include one or more processors 22 and memory 24 that stores code 25 for implementing views 11, models 15, controllers 14, and associated elements. Back-end system 21 may be any type of data repository or computing device that is capable of providing data to front-end server 16 and/or of receiving data from front-end server 16. Client 12, back-end system 21, and front-end server 16 each may be implemented using more than one computing device (e.g., a server farm), even though only one computing device for each is shown in FIG. 1.

Forms of the foregoing architecture are used by many types of UI technologies, including BSP and Web Dynpro. Described below is a process for converting one UI technology, such as BSP, into another UI technology, such as MVC-based Web Dynpro. Brief descriptions of Web Dynpro and BSP are provided below, followed by a description of the conversion process.

Web Dynpro

In Web Dynpro, a developer associates views to screen space and specifies the appearance of an end-user's screen by arranging basic UI elements within the views. Views are strung together with one or more navigational links to define a possible sequence that the user will see. One aspect of a view is its layout. Generally, the layout constitutes an arrangement of controls. A control is an interactive UI element, such as input fields, buttons, selectable menu items, and checkboxes. Also contained within a view are a view controller and its associated view context. A view controller contains presentation logic that responds to user action, such as pressing a button or using a menu item. The view context is the local memory of the view controller.

In Web Dynpro, views are generated on a server, but are rendered on a client. Different technologies for rendering might be supported, e.g., using a browser as a rendering engine or clients that perform rendering based on an underlying operation system.

A component controller (which is separate entity from a view controller) is software that acts as a mediator between different views or between a view and a model. A component controller implements one or more event handlers, which react to user actions. An event handler is code that executes when a user performs an action, such as selecting a menu item or activating a control.

Thus, while views define what an end-user sees on-screen, a view controller handles actions that are invoked from the screen, such as clicking a button and selecting data in a table, or passes the actions on to a component controller so that it can handle the actions. The component controller is used for inter-view communication and can also be used for invoking functions exposed by a model. The hierarchy of data that a controller (view or component) owns is its context (described below). For data to automatically travel from one controller to the other, it is possible to assign mappings between the contexts of different controllers. For other relationships, bindings may be set to define automatic, bi-directional data flow between a part of a context and UI elements in a view's layout or a part of a model layer that encapsulates a back-end system.

A context is a local memory and the communicational part of a controller. Each controller has an associated context. This context contains and maintains state(s) specific to its corresponding controller during the controller's lifetime. Each context instance is directly bound to a controller instance. The context contains local data fields, and can establish relations to data defined within a model, or to the contexts of other controllers. The context is hierarchically structured, meaning that data within the context is organized as a data tree. Each context may also have associated nodes and attributes. Controllers communicate by context mapping, i.e., by providing other controllers with context data. This context mapping can be performed between a view controller and a component controller. The component controller may be in the same Web Dynpro component as the view, or in a different Web Dynpro component that is defined as a "used component" in a preview of the current component. Context mapping can also be performed between a component controller and another component controller in a different Web Dynpro component that is defined as a "used component" in a preview of the current component.

A model is software that grants a framework access to a back-end system (e.g., data storage and/or business logic). The back-end system may reside, e.g., in an SAP® R/3 system. The model exposes business data and metadata through a common model interface (CMI). That is, the model acts as a mediator between controllers in the Web Dynpro application and the back-end system to route data, commands, and/or other types of information between the controller and the back-end system.

One advantage of Web Dynpro is that the application developer does not need to generate code to develop an application. Instead, the application developer constructs the application via a declarative programming model that uses metadata to define elements of the application. Thus, instead of writing code, the application developer uses available tools to declare development objects and relationships between the development objects. That is, the application developer creates development objects in a declarative way by using metadata rather than by writing code. The result of this declarative programming process is a metanodel that defines development objects for a Web Dynpro application. Examples of such development objects include controls (e.g., screen controls such as buttons and input fields), views (e.g., displays with layouts of UI elements), data bindings (e.g., bindings between UI elements and application data), and inbound and outbound plugs as start- and end-points that implement navigational links between views.

After development objects have been created, a generator uses the development objects to generate run-time objects (e.g., classes and source code) that can be deployed for use by an application. That is, the development objects are a declarative representation and, therefore, are not executable. The generator transforms those development objects into source code that can be compiled to execute the application. The generator can generate run-time objects using specific languages such as, for example, Java, eXtensible Markup Language (XML), and/or other platform-neutral, or platform-specific, source code. The generator typically is made up of one or more templates that can interpret metadata.

At run-time, the Web Dynpro framework invokes the model to interact with the back-end system, e.g., to retrieve data from, or to store data in, the back-end system.

Business Server Pages (BSP)

BSP is a UI technology for generating pages that may be displayed, e.g., via a Web browser. A BSP application typically includes a UI and business logic. The business logic of a BSP application may be encapsulated in an application class. The application class may be implemented using a global ABAP class. This global ABAP class provides access to business data, which is typically stored as attributes of the class. Page generated by a BSP application can directly reference components of this class (such as attributes, methods, and the like) using a predefined object application.

A BSP application can be implemented using MVC-type views and controllers. The controllers contain business logic and associated application data. The controllers analyze data from an incoming request (e.g., a user input) and control rendering of a view for responding to the request. The pages that are produced as a result may be Web pages, which can contain static hypertext markup language (HTML) code and/or dynamic scripting code, such as ABAP code or JavaScript®. The pages also include event handlers that respond to user actions in a manner that is similar to the event handlers in Web Dynpro, and have a navigation structure, which directs navigation between individual pages.

Conversion From BSP to Web Dynpro

Figure 2:
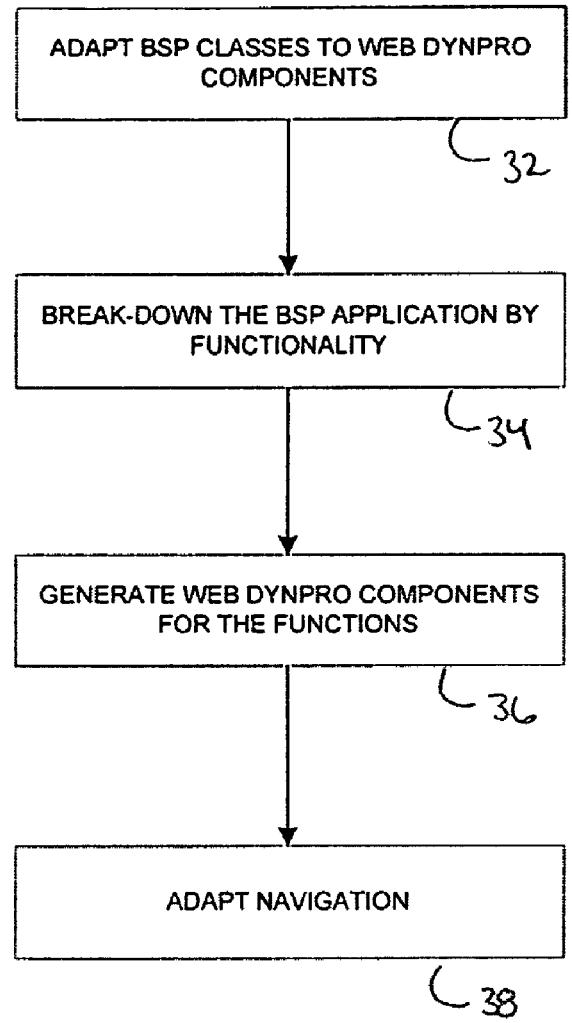
FIG. 2 is a flowchart showing a process for converting components for a first UI technology (in this example, BSP) into components for a second UI technology (in this example, Web Dynpro).

Referring to FIG. 2, a process 30 is shown for converting BSP content into Web Dynpro content. Process 30 begins by adapting (32) BSP application classes to Web Dynpro components. Essentially, this promotes reusability of BSP content by enabling Web Dynpro to access, and use, components that are already implemented in BSP.

Here, process 30 includes modelling BSP application classes as Web Dynpro components. This includes identifying the functionalities and public methods of each BSP application class. The public methods are adapted to methods of a Web Dynpro component called a Web Dynpro model component. Web Dynpro model components are a special type of Web Dynpro component that behaves like a model in the MVC architecture. Web Dynpro model components do not have views, since they are used to expose certain functionalities to other components containing views. In order to make the BSP application classes accessible to Web Dynpro components, these functionalities are exposed at a Web Dynpro model component's interface. The code inside the BSP ABAP classes is substantially unchanged, except for code used to export and import data. In particular, the data import code and export code is configured to fetch values from a Web Dynpro context and to write those values to another context.

In process 30, BSP model attributes that are data bound to BSP view components are identified and modelled as contexts and attributes of corresponding Web Dynpro model components. The resulting contexts and attributes (of Web Dynpro model components) are exposed at an interface of the Web Dynpro model component. Such a context can be mapped to the view(s) of another component via context mapping. UI elements in such a view can then be data bound to the context of the view controller. Thus, user inputs to the UI elements can be propagated to and from the context of the Web Dynpro model component, thereby achieving substantially the same functionality as using data binding between BSP models and BSP views. By following this process, the code inside of the original BSP components may remain substantially unaltered, except for code that is used to export/import data. In particular, rather than assigning values to variables to be exported, that code populates the resulting Web Dynpro context nodes and attributes.

In process 30, the BSP application is broken-down (34) by functionality, and Web Dynpro components are generated (36) for the resulting functions. Generally speaking, this is done by identifying functionality in the BSP components, correlating that functionality to native components of Web Dynpro, and generating the native Web Dynpro components (e.g., view layouts, view controllers, component controllers). Functionality of the BSP application that is used frequently in various BSP objects may be a good candidate for breaking-down into independent Web Dynpro components. These Web Dynpro components can then be reused by other Web Dynpro components. The native Web Dynpro components may be generated using new code or some/all of existing BSP code. The functionality of the BSP components may be identified by classifying BSP controllers and views that define a single functionality, and generating native Web Dynpro components for each identified function. The resulting Web Dynpro components should replicate the functionality of the entire BSP application.

To generate the Web Dynpro components, BSP views and controllers are adapted to Web Dynpro views and controllers. For example, a BSP view can be modelled as one or more Web Dynpro views, and a BSP controller can be modelled as one or more Web Dynpro view controllers or component controllers. A BSP controller may be modelled as a component controller of a Web Dynpro component. Likewise, a BSP model used by the BSP controllers may be modelled as a corresponding Web Dynpro model component.

To generate Web Dynpro views for each BSP view, Web Dynpro UI elements are used that substitute for BSP HTMLB (HTML-Business for Java) UI elements. In order to migrate BSP views bound to BSP application class attributes to Web Dynpro, Web Dynpro views are created. Elements corresponding to the BSP application class attributes are data-bound to the context/attributes of the Web Dynpro views, and are mapped to the context of a Web Dynpro model component associated with the views.

To migrate BSP controller event handling to Web Dynpro, events that are handled inside the "do_handle_event" (an event controller) of a BSP controller are identified. Corresponding Web Dynpro events and event handlers are defined in one or more Web Dynpro view controllers. The BSP events are assigned to elements in a Web Dynpro view in much the same way as BSP view elements are attached to their events. Code inside other methods of BSP controllers may need to be moved to corresponding Web Dynpro component methods. Whether the code is moved is determined on a case-by-case basis.

In process 30, BSP navigation is adapted (38) to the newly-generated Web Dynpro components. For functional components that map directly between BSP and Web Dynpro (e.g., a one-to-one mapping), and that require navigation only within a functional component, navigation in Web Dynpro can be achieved by using inbound and outbound plugs. In particular, navigation activities in the BSP application can identified and replicated via appropriate Web Dynpro inbound and outbound plugs to navigate between Web Dynpro views. Dynamic navigation may also be implemented using Web Dynpro.

Navigation is also adapted for functional components of a BSP application that are converted to separate Web Dynpro components (i.e., there is not a one-to-one mapping). In such cases, an event in the first Web Dynpro component may be raised and exposed to the second Web Dynpro component, which may "catch" and handle the event. In this implementation, the usage of (or contact to) the first Web Dynpro component may be defined in the second Web Dynpro component. The event of the first Web Dynpro component is exposed at the interface of the first Web Dynpro component and the event handler for this event is defined in the second We Dynpro component.

All or part of process 30 and any modifications thereto (hereinafter referred to as "the processes") can be implemented manually. Likewise, all or part of the processes can be implemented via a computer program product, i.e., a computer program tangibly embodied in one or more information carriers, e.g., in one or more machine-readable storage media or in a propagated signal, for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a network.

Actions associated with implementing the processes can be performed by one or more programmable processors executing one or more computer programs to perform the functions of the calibration process. All or part of the processes can be implemented as, special purpose logic circuitry, e.g., an FPGA (field programmable gate array) and/or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only storage area or a random access storage area or both. Elements of a computer (including a server) include one or more processors for executing instructions and one or more storage area devices for storing instructions and data. Generally, a computer will also include, or be operatively coupled to receive data from, or transfer data to, or both, one or more mass storage devices for storing data, e.g., magnetic, magneto-optical disks, or optical disks. Information carriers suitable for embodying computer program instructions and data include all forms of non-volatile storage area, including by way of example, semiconductor storage area devices, e.g., EPROM, EEPROM, and flash storage area devices; magnetic disks, e.g., internal hard disks or removable disks; magneto-optical disks; and CD-ROM and DVD-ROM disks.

The processes are not limited to Web Dynpro and BSP, but rather may be used with any UI-technology and, in particular, those that are MVC-based.

Elements of different implementations described herein may be combined to form other implementations not specifically set forth above. Other implementations not specifically described herein are also within the scope of the following claims.

What is claimed is:

1. A method to convert components for a first user interface (UI) technology into components for a second UI technology, the method comprising:
   responsive to identifying functionalities of the first UI technology as corresponding to controller components of the first UI technology, using one or more processors, enabling the second UI technology to access the controller components, the controller components to control interactions and data transfer between components;
   responsive to identifying functionalities of the first UI technology as corresponding to view components of the first UI technology, modeling the view components as native components of the second UI technology, the view components to represent a UI of the first UI technology, the controller components being usable by the native components; and
   defining one or more navigational paths through the native components.

2. The method of claim 1, wherein the first UI technology comprises Business Server Pages and the second UI technology comprises Web Dynpro.

3. The method of claim 1, wherein the controller components comprise attributes that are data bound to the view components; and
   wherein enabling comprises:
   modeling the attributes that are data bound to the view components as context nodes and attributes of the second UI technology; and
   exposing the context nodes and attributes to the second UI technology.

4. The method of claim 1, wherein enabling comprises:
   identifying public methods of the first UI technology, the public methods being part of the controller components of the first UI technology; and
   adapting the public methods to the components of the second UI technology.

5. The method of claim 1, wherein modeling comprises:
   identifying functionalities in the view components;
   correlating the functionalities in the view components to functionalities in the native components; and
   generating the native components.

6. The method of claim 5, wherein generating comprises binding a first component to a context of a view component of the second UI technology, the view component of the second UI technology comprising a native component.

7. The method of claim 5, wherein generating the native components comprises generating the native components from the view components.

8. The method of claim 7, wherein the components of the first UI technology comprise a view and a controller, and the components of the second UI technology comprise a view, a view controller, and a component controller.

9. The method of claim 1, wherein defining the one or more navigational paths comprises:
   using inbound and outbound plugs associated with the native components to link at least some of the native components and thereby define the one or more navigational paths.

10. The method of claim 1, wherein defining the one or more navigational paths comprises:
    exposing an event in one native component to an external interface that is accessible to a second native component.

11. A non-transitory machine-readable storage medium to convert components for a first user interface (UI) technology into components for a second UI technology, the machine-readable storage medium comprising instructions that cause one or more processing devices to perform a method, the method comprising:
    responsive to identifying functionalities of the first UI as corresponding to controller components of the first UI technology, enabling the second UI technology to access the controller components, the controller components to control interactions and data transfer between components;
    responsive to identifying functionalities of the first UI technology as corresponding to view components of the first UI technology, modeling the view components as native components of the second UI technology, the view components to represent a UI of the first UI technology, the controller components being usable by the native components; and
    defining one or more navigational paths through the native components.

12. The non-transitory machine-readable storage medium of claim 11, wherein the first UI technology comprises Business Server Pages and the second UI technology comprises Web Dynpro.

13. The non-transitory machine-readable storage medium of claim 11, wherein the controller components comprise attributes that are data bound to the view components; and
    wherein enabling comprises:
    modeling the attributes that are data bound to the view components as context nodes and attributes of the second UI technology; and
    exposing the context nodes and attributes to the second UI technology.

14. The non-transitory machine-readable storage medium of claim 11, wherein enabling comprises:
  identifying a public methods of the first UI technology, the public methods being part of the controller components of the first UI technology; and
  exposing the public methods to the second UI technology.

15. The non-transitory machine-readable storage medium of claim 11, wherein modeling comprises:
  identifying functionalities in the view components;
  correlating the functionalities in the view components to functionalities in the native components; and
  generating the native components.

16. The non-transitory machine-readable storage medium of claim 15, wherein generating comprises binding a first component to a context of a view component of the second UI technology, the view component of the second UI technology comprising a native component.

17. The non-transitory machine-readable storage medium of claim 15, wherein generating the native components comprises generating the native components from the view components.

18. The non-transitory machine-readable storage medium of claim 17, wherein the components of the first UI technology comprise a view and a controller, and the components of the second UI technology comprise a view, a view controller, and a component controller.

19. The non-transitory machine-readable storage medium of claim 11, wherein defining the one or more navigational paths comprises:
  using inbound and outbound plugs associated with the native components to link at least some of the native components and thereby define the one or more navigational paths.

20. The non-transitory machine-readable storage medium of claim 11, wherein defining the one or more navigational paths comprises:
  exposing an event in one native component to an external interface that is accessible to a second native component.

* * * * *